United States Patent [19]

Ursin et al.

[11] Patent Number: 4,491,933
[45] Date of Patent: Jan. 1, 1985

[54] WORD PROCESSOR

[75] Inventors: Thomas N. Ursin; Verne L. Severson, both of Minneapolis, Minn.

[73] Assignee: Wordtronix Inc., Minneapolis, Minn.

[21] Appl. No.: 359,497

[22] Filed: Mar. 18, 1982

[51] Int. Cl.³ .............................................. G06F 1/00
[52] U.S. Cl. .................................................... 364/900
[58] Field of Search ... 364/200 MS File, 900 MS File; 340/700, 711, 712, 720, 721

[56] References Cited

U.S. PATENT DOCUMENTS

| | | | |
|---|---|---|---|
| 4,057,849 | 11/1977 | Ying et al. | 364/200 |
| 4,189,727 | 2/1980 | Vaughn, Jr. | 364/900 |
| 4,298,957 | 11/1981 | Duvall et al. | 364/900 |
| 4,398,246 | 8/1983 | Frediani et al. | 364/200 |
| 4,398,264 | 8/1983 | Couper et al. | 364/900 |

*Primary Examiner*—Raulfe B. Zache
*Attorney, Agent, or Firm*—Hugh D. Jaeger

[57] ABSTRACT

Word processor having a keyboard including standard typewriter keys and additional user keys including a plurality of function keys for implementing word processing. A CRT simulates and electronic sheet of paper with margins on four sides and an index scale for a selected typing pitch. The electronic blank sheet of paper is scrolled and displays a space between the bottom of the sheet and the top of the next sheet of paper. The characters can be horizontally scrolled and wrapped around during typing. Row address tables in the display controller dynamically store strings of information for each 85 character row of the screen by linking of rows through tables. The display controller board also provides for an enhanced display of character attributes on a character by character basis where a character is retrieved from memory fourteen times for display.

The word processor includes logic hardware which generates 85 columns across the CRT screen and 57 lines down the screen where each character is in an 8×14 field. A three-line message including a dimmed video block cursor about the typing line, a margin line including small margin numbers, and an information dialogue line is movably positioned below the electronic sheet of paper. Additional lower space below the 3-line message provides a menu and help area including options or instructions for selected features. The logic in the system also provides a page break in between each sheet of paper as the paper is scrolled on the screen.

25 Claims, 10 Drawing Figures

WORD PROCESSOR

CROSS REFERENCES TO CO-PENDING APPLICATIONS

The application relates to an application filed on Mar. 18, 1982, Ser. No. 359,487, entitled "Word Processor," inventors Zimmerman, Severson and Ursin, and an application filed Mar. 18, 1982, Ser. No. 359,616, entitled "Word Processor," inventors Severson and Ursin;

BACKGROUND OF THE INVENTION

1. Field of Invention

The present invention pertains to a word processor and, more particularly, pertains to the display controller for the word processor.

2. Description of the Prior Art

Prior art word processors have five major disadvantages of high front-end cost: numerous, extensive and complex logic boards in the electrical circuit; extensive software requiring complex routines in addition to long periods of time to run, questionable reliability; and complex functional keyboards for a user in operating the word processor requiring considerable knowledge and training.

Prior art word processors have traditionally been high cost and serving the high-end markets such as large corporations and large businesses who could afford such equipment which in the past has usually been considered a luxury. The prior art systems have usually required complex logic circuits, dedicated space and dedicated furniture, all of which added to front-end cost.

Recent prior art word processors have been low cost and are difficult to use in that the keyboard simulates a computer keyboard having little relation to a typewriter keyboard. The CRT screen is similar to a computer terminal. The screen text has no relation to a typed page and typically no margins.

Prior art word processors for the most part contained numerous logic boards, each board having numerous components. The number of logic boards, added to the cost, complexity and reliability of the word processor, and in addition generated considerable heat and noise besides consuming large amounts of power. Numerous logic circuits are susceptible to all of the electrical pitfalls of extensive logic circuits.

Prior art word processors required extensive software having complex routines which require relatively long periods of time to load and run, based on extensive logic circuitry. Complex software results in numerous difficulties to the designers of hardware and results in the vicious software-hardware circle, subsequently yielding a high cost system. Further, prior art machines are locked into specific software thereby not providing for other software packages for disciplines such as accounting, etc.

Prior art word processors have had reliability problems due to extensive hardware logic and extensive software, low level language and custom tools. It has been common for the word processors to cease to operate based on logic failure or to lock up due to a software or hardware-software problem. Such an occurrence is not only frustrating to the user in addition to being costly, but also is non-productive which is a most important consideration.

Prior art keyboards have required considerable manual manipulation in performing such tasks as editing, erasing, underlining, and other related word processing functions. The operator utilized extensive time in performing word processing functions in having to touch numerous keys for implementing a word processing function. The operator after a period of time would suffer from physical fatigue as well as mental fatigue in performing a word processing task or tasks. Some prior art keyboards would not even perform the full range of word processor functions. The prior art keyboards resulted in lost time and motion, and were non-productive and expensive to the end user. Most importantly, the prior art word processor keyboards required considerable operator training.

One other significant prior art problem was the CRT display. Prior art screen displayed green characters on a dark background or white characters on a dark background, both types of displays which also contributed to operator fatigue. The screens over-enhanced the high contrast characters leading to eyestrain in viewing precise characters on such a CRT background. Also, where a white background was displayed on a CRT, the white background was smaller in size than a full sheet of paper such as not displaying the entire length or width of an electronic sheet of paper.

Another significant prior art problem was that prior art word processors required the use of a separate code for many special characters used in foreign languages that are built from standard characters. For example, a first code was required for the letter "e" while a second different code was required for the character "è". The required extra codes required extra memory as well as display time, etc.

Additional prior art problems were the ability to simulate word processor typewriter integrity including a full electronic sheet of paper on a CRT screen with vertical scrolling of the sheet of paper including page breaks between each page as in a real mode of typing. Prior art word processors have failed to initiate a true electronic typewriter. The prior art machines also failed to generate a full sheet of electronic paper such as a standard sheet ($8\frac{1}{2}'' \times 11''$ or A4) including margins on a full size CRT screen. Another problem was adequate display of information for the user to select options or instructions such as for set up, display, typing attributes, or subsequent printing. A further problem was that prior art word processors usually displayed nontyping codes on the screen which were required for use by the operator during information processing functions. Finally, some prior art word processors displayed codes or other modes for processing functions on the screen during typing.

The present invention overcomes the disadvantages of the prior art by providing a word processor which overcomes the disadvantages of the prior art problems and provides a highly efficient system which is simple, reliable and affordable. The system is user oriented, using techniques familiar to a typist and other functions are organized so that a typist can easily access and implement normal typist duties without formal training and assistance from others.

SUMMARY OF THE INVENTION

Purpose of the present invention is to provide a word processor having an electronic full page sheet of paper display on a cathode ray tube (CRT) providing conceptual integrity in that the word processor simulates by way of the CRT a real typewriter including all related functions during typing. The word processor can also be used for text editing, accounting, mailing lists, and other related information processing based on specific software packages. The word processor is configured to stand alone on a standard secretarial "L", display black characters on a white background representing an electronic sheet of paper, store information on flexible diskettes and include an uniquely configured keyboard similar to the standard office typewriter keyboard.

Word processor for purposes of this patent is an inclusive term including other related processing functions such as text editing, generating of a mailing list, accounting functions, and other information processing as required by an operator. The system limitations of the word processor is dependent upon the hardware of the display controller logic and processor logic.

According to one embodiment of the present invention, there is provided a display controller for a word processor including a processor logic board, disk drives, a printer, a keyboard, and a cathode ray connected to the processor, said display controller comprising a dot clock and character clock timing generator providing a plurality of logic timing signals; display memory of 16K expandable to 64K including a plurality of row address tables (RATS); interface logic connecting the display memory to the processor board; RAT address generator and next character address generator connected to the display memory through multiplexers; display memory timing logic signals for accessing the display memory and providing arbitration logic for the processor and display memory and connected to the timing generator; video control register for setting the characteristics of the display and the location of memory the processor writes to and horizontal skip register for controlling horizontal scrolling of the display connected to the display memory registers including a holding register, a display register and a control code register including a filter having PROMS and PALS for controlling the display characters into the registers; address generators for buffering in and displaying columns and connected to the timing generator; display character row buffers and control code row buffers connected to the registers and address generators; character generators connected to the buffers through latches and a multiplexer for converting character codes and scan line codes into binary equivalent of pixels to be displayed; decode counter connected to the display column address counter for generating horizontal retrace time, vertical retrace time and video blanking time; and, interface logic including a shift register and video control logic between the CRT and the character generators whereby the display controller generates the display on the CRT, the RAT tables dynamically store strings of data which can overlap between the rows of the tables, the holding registers include the filter of PROMS snd PALS for directing of display characters, the horizontal skip register and skip counter control horizontal scrolling, and the character generators character attributes including bold, dimmed, reverse video, strike through, underline, superscripts and subscripts thereby providing a generated display on an electronic sheet of paper on the CRT.

The hardware of the embodiment of the present invention also performs the following operations. The character generators generate the full size electronic sheet of white paper on the CRT screen; the vertical scrolling of the sheet of paper takes place through use of the RAT's in the display memory; the row buffers hold the 85 columns horizontally scrollable through 250; each 8×14 character field is controlled by the character generator ROM and RAM. The display memory stores the 3 line message area including the margin line and dimmed video cursor, the information line such as page and line numbers, and the communications dialogue line, the display memory stores the menus and help instructions, the RAT's store the margin scale which the character generator RAM is responsible for the margin numbers, the dimmed video cursor is generated by the character generator and PAL's, and the reverse video windows are generated by the PAL's.

Some significant aspects and features of the present invention include extensive user preference modes as delineated below:

1. An 85 character-wide screen with horizontal scroll to 132 or an optional 168 positions, showing 10-, 12-, or 15-pitch characters, 57 lines can be displayed on one sheet of paper;
2. Characters are an 8×12 matrix, including descenders within a 10×14 matrix dot field;
3. Exact correlation between screen image and printer, including underline, bold, sub- and superscripts, right and left justification, and hyphenation;
4. Exact visual correlation between paper and "Electronic Paper": page breaks, for example, are shown graphically as sheets of Electronic Paper "rolling" up or down the screen;
5. An "OOPS" (recovery) button which undoes the previous function key stroke;
6. Extensive self-training or teaching features, including a HELP key for tutorial operator assistance, online operator documentation, and the ability to remove menus once the system has been mastered;
7. An insert "window" which allows unlimited inserts while keeping the following text on screen of the CRT display;
8. The ability to assign several attributes (such as bold, underline, superscript, overstrike, and others) simultaneously to characters both onscreen and printing, including more than one attribute at a time;
9. Automatic pagination to screen and printer, according to the margins set;
10. Electronic storage at the operator station; and,
11. Storage by document, not page, increasing operating ease of use and the amount of storage capacity.

Further significant aspects and features of the present invention includes ease of operation and set up modes as delineated below:

1. A minimum number of function keys. In addition to the normal typewriter function keys (Tab set and clear, for example), and cursor control keys, the only other function keys are: Print, File, Insert, Delete, Reverse and Set Up;
2. Two special assistance keys. The OOPS key undoes the previous function. The HELP key provides tutorial aids;
3. Elimination of all non-printing computer codes, so that what is on the screen is exactly what is printed;
4. Typewriter-style rocker keys for Tab and vertical scrolling;
5. Paper size selection on the screen;
6. Telephone-type connectors for all system components, including the printer.
7. Power cord take-up bracket;
8. Hand depressions in the console for easy carrying;
9. Automatic equipment checks that perform start-up and runtime diagnostics on all components, and display results on an LED indicator at the back of the console; and 10. Quiet operation through cabinet and system engineering which does not necessitate fans.

Other significant aspects and features of the present invention includes numerous set up and operation modes as delineated below:

1. Elimination of all non-printing computer codes, so that what is on the *Electronic Paper is exactly what is printed,* including underline, bold, sub- and superscripts, right and left justification, and hyphenation. Sheets of paper are shown graphically as sheets of Electronic Paper "rolling" up or down the screen;
2. Extensive use of graphics to make choices in menus or actions simple and unambiguous;
3. An insert "window" which allows unlimited inserts while keeping the following text onscreen;
4. The ability to simultaneously assign several attributes (such as bold, underline, superscript, overstrike, and others) to characters both onscreen and printing;
5. Paper size selection on the screen, rather than through menus or at the print operation;
6. Electronic storage at the operator station, called the Electronic File Drawer;
7. Storage by document, not page, increasing ease of use and the amount of storage capacity;
8. Setup and styling features such as telephone-type connectors for all system components, including the printer, a power cord take-up bracket, and hand depressions for easy carrying; and,
9. Automatic equipment checks that perform start-up and runtime diagnostics.

The above modes are in conjunction with the other functions such as wordwrap, insert, delete, centering, and margin control.

An additional significant aspect and feature of the present invention is to provide a display controller which utilizes a least amount of logic and utilizing circuit logic to the upmost capability for optimum processing of information in least time. Least circuit logic also provides the highest degree of reliability and the least amount of heat produced in the logic circuits. The least amount of heat therefore eliminates the need for cooling fans and therefore provides a quiet operation of the unit.

Further significant aspects and features of the present invention include a word processor which provides conceptual integrity where the CRT electronically simulates a real typewriter as viewed by a user including a full size sheet of paper display on the screen with side margins and top and bottom of the sheet. When the print command is actuated, the printer prints exactly what is displayed on the CRT screen. Since no codes or other information is displayed on the CRT screen during the word processing functions, the printer prints exactly what is displayed on the electronic sheet of white paper on the CRT screen. There is a finite feeling of flow of conceptual integrity during the flow of typing where the system is consistent. The word processor is also user managed where the user manages the display, changes the state of the information as displayed, regulates the page breaks, and controls the overall operation of the word processor. The system provides sensory feedback to the user through processor board auditory feedback through a speaker module in the keyboard for appropriate commands, and visual feedback through the CRT screen. The speaker module provides a 'click' for each key press, a 'beep' for the error key, and an 'alert' for a menu selection. The word processor comes alive in an active state to display information on the screen as processed by the user operator.

Additional significant aspects and features of the present invention includes a document oriented CRT screen for a word processor, a HELP key for tutorial operator assistance messages on the screen including an extensive menu area, and an OOPS key to recover from a previous key selection. The CRT screen includes an 85 character screen width, paper size selection on the screen, and strike-through on screen (and also the printer). The electronic sheet of paper is exactly what one sees on the screen is what one gets printed on the printer including underlining, bold, subscript, superscript, right and left justification, and hyphenation. The word processor displays up to five character attributes simultaneously without any computer codes appearing on screen, a significant advantage over the prior art, and through the programmable array logic hardware.

Having thus described the invention, it is a principal object hereof to provide a unique, new and novel word processor.

One object of the present invention is to provide a word processor having numerous setup and operating modes and extensive user preference modes. The word processor is devoted to being user oriented providing visual, audio, and digitory feedback during operation. The CRT provides visual feedback to the operator. The keyboard similar to the standard office typewriter includes a small audio speaker providing clicks for keys, beep for error and an alert for functions providing audio feedback through the speaker in the keyboard. The word processor provides conceptual integrity of a real typewriter to the operator with flow of typing through conceptual integrity to a realistic display of an electronic sheet of paper with typing thereon.

Another object of the present invention is to provide a word processor which substantially simulates a typewriter. In reality, an electronic sheet of paper, displayed as white paper, is displayed on the screen along with the typing index dependent upon pitch, margins, and location of the typing element represented as the cursor. The margin line is movable from below the sheet of paper up onto the sheet of paper. Furthermore, the word processor simulates a typewriter by incorporating a display controller that actually represents a display character attributes visually on the screen (such as bold, subscript, etc.).

Other objects of the present invention include a cursor on the screen which can disappear and then reappear, moving of a background area over a selected feature, printing of any one of the selected attributes, and providing of a menu below the sheet of paper.

Further objects of the present invention provide a number of menus, each menu which displays a list of instruction from which to choose. Each menu displays a list of functions and provides a guide to the mode of operation.

Additional objects include a system where a processor logic board controls all functions of the word processor and is considered the active component of the word processing system. The display controller logic board is inactive until instructed by and receiving information from the processor and once data appears, so displays the same on the CRT. The keyboard is manually activated by the operator even though the processor is in control of the system.

Still additional objects of the present invention include the vertical scrolling of the electronic sheet of paper, and the vertical scrolling of the page break between two electronic sheets of paper; the movable 3 line message area including the dimmed video block cursor on a margin line having reduced size numbers, an information line such as page number and line number, and a communication dialogue line; and, the reverse video windows for selections of typing features such as name of the document, type of paper feed, pitch, margin form, format, page length, line spacing, page number, page number location, starting page number, top margin, bottom margin, searching, and substitutions where the reverse window is positioned over the feature for the selected typing function. Also, the display is 85 columns wide by 57 lines long where each character is generated in a 9×14 field.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein.

DESCRIPTION OF PREFERRED EMBODIMENTS

Figure 1:
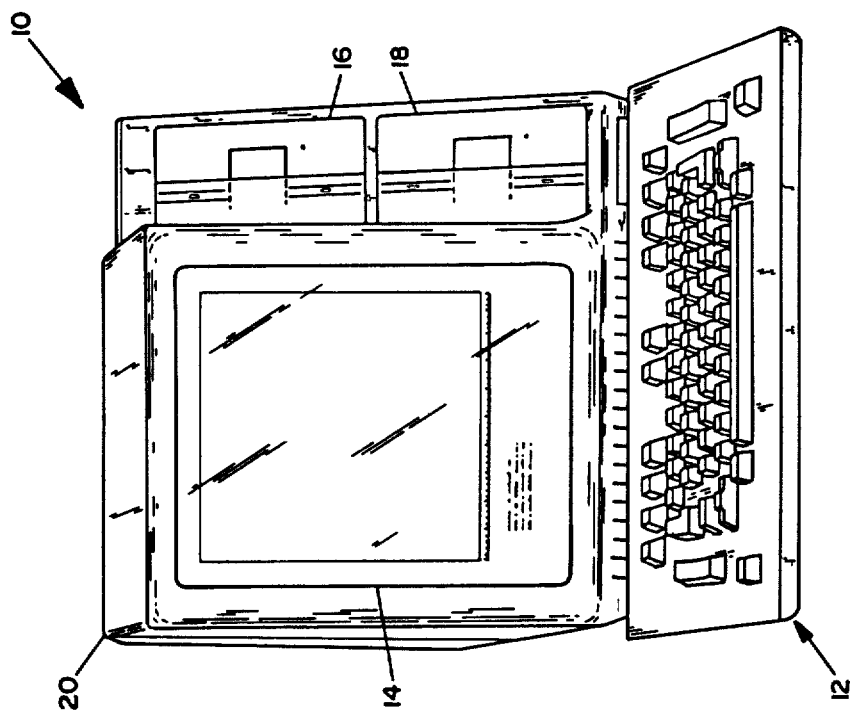
FIG. 1 illustrates a perspective view of a word processor including a printer.
Figure 1:
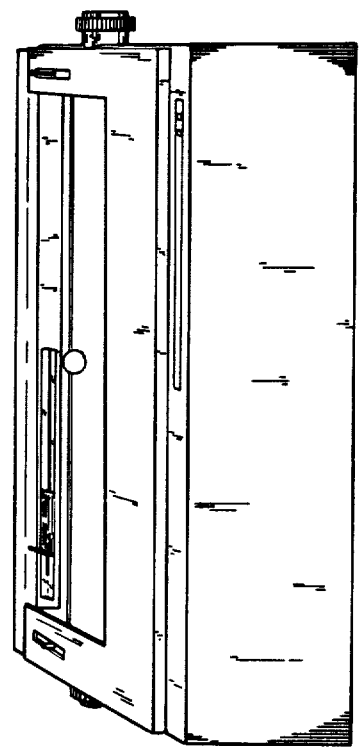
Figure 2:
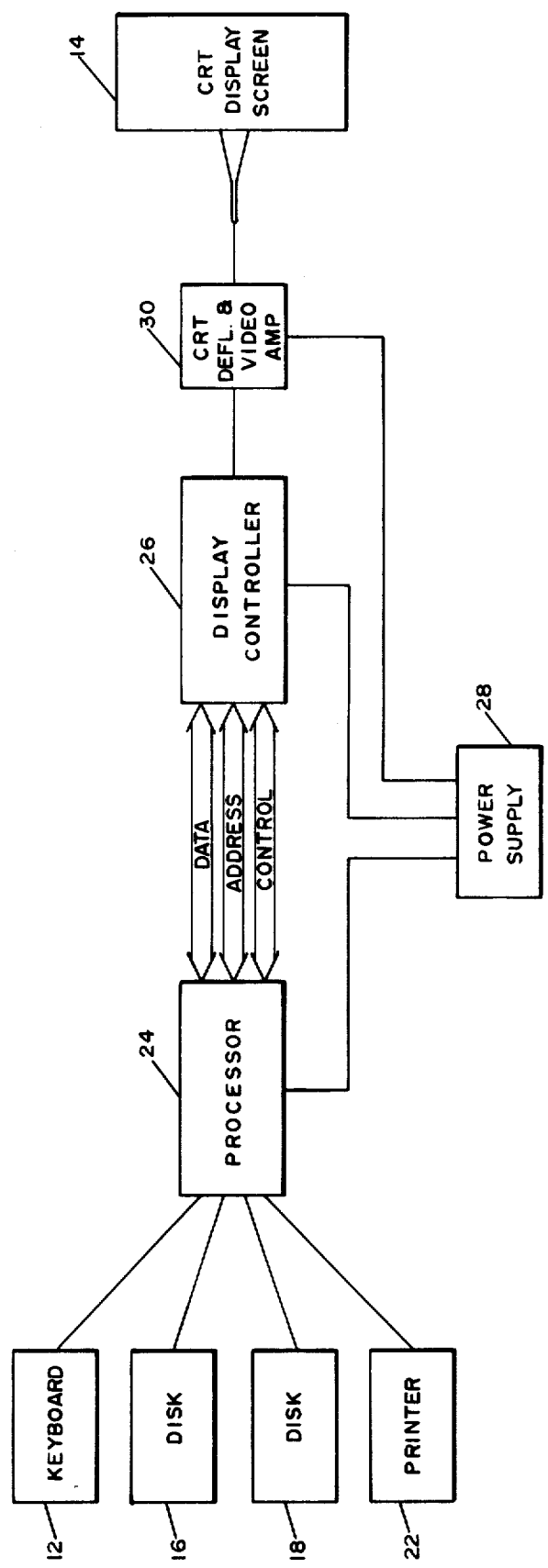
FIG. 2 illustrates a block diagram of an electrical circuit of the word processor.
Figure 4:
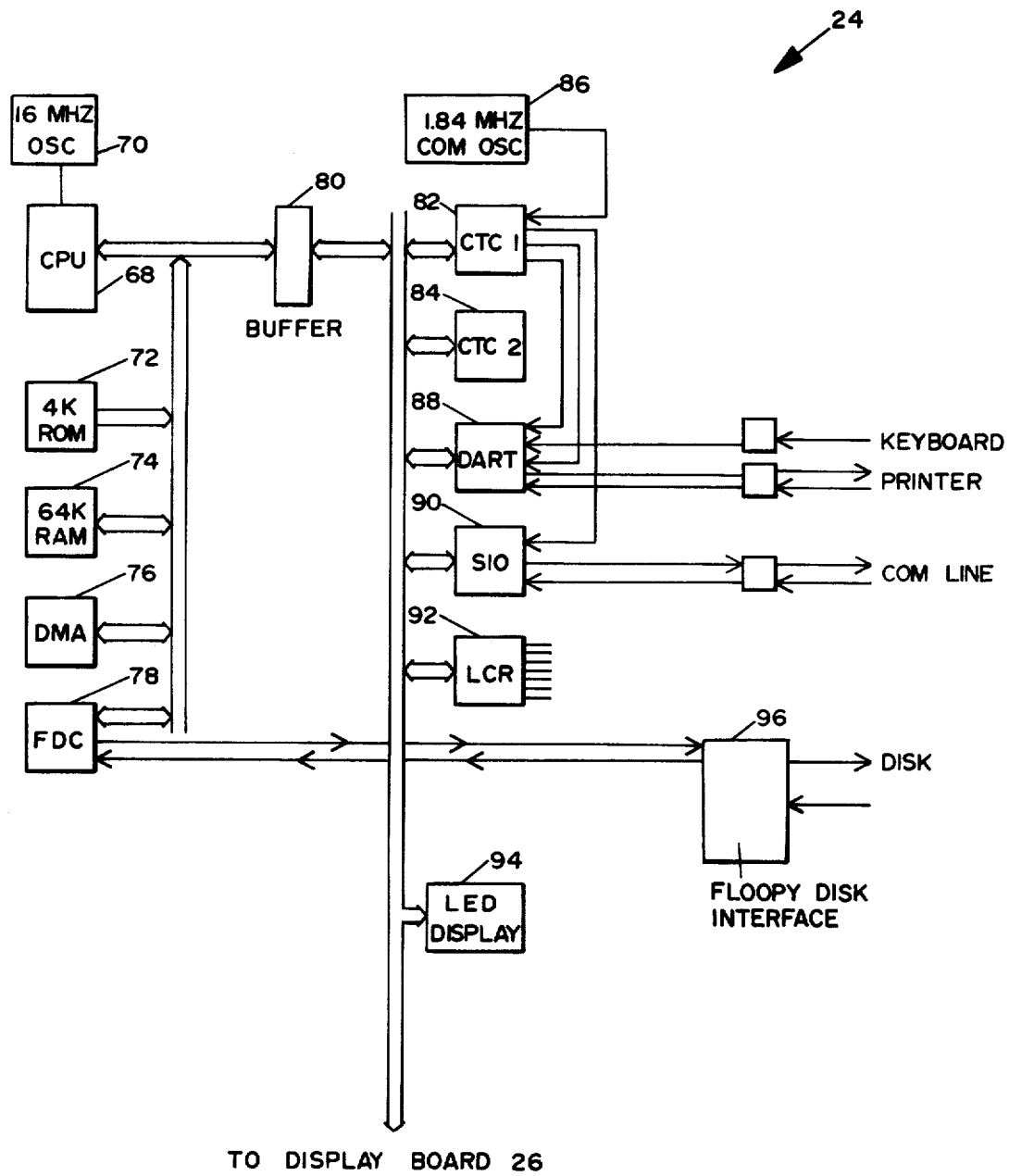
FIG. 4 illustrates a block diagram of an electrical diagram of a processor for the word processor.
Figure 5A:
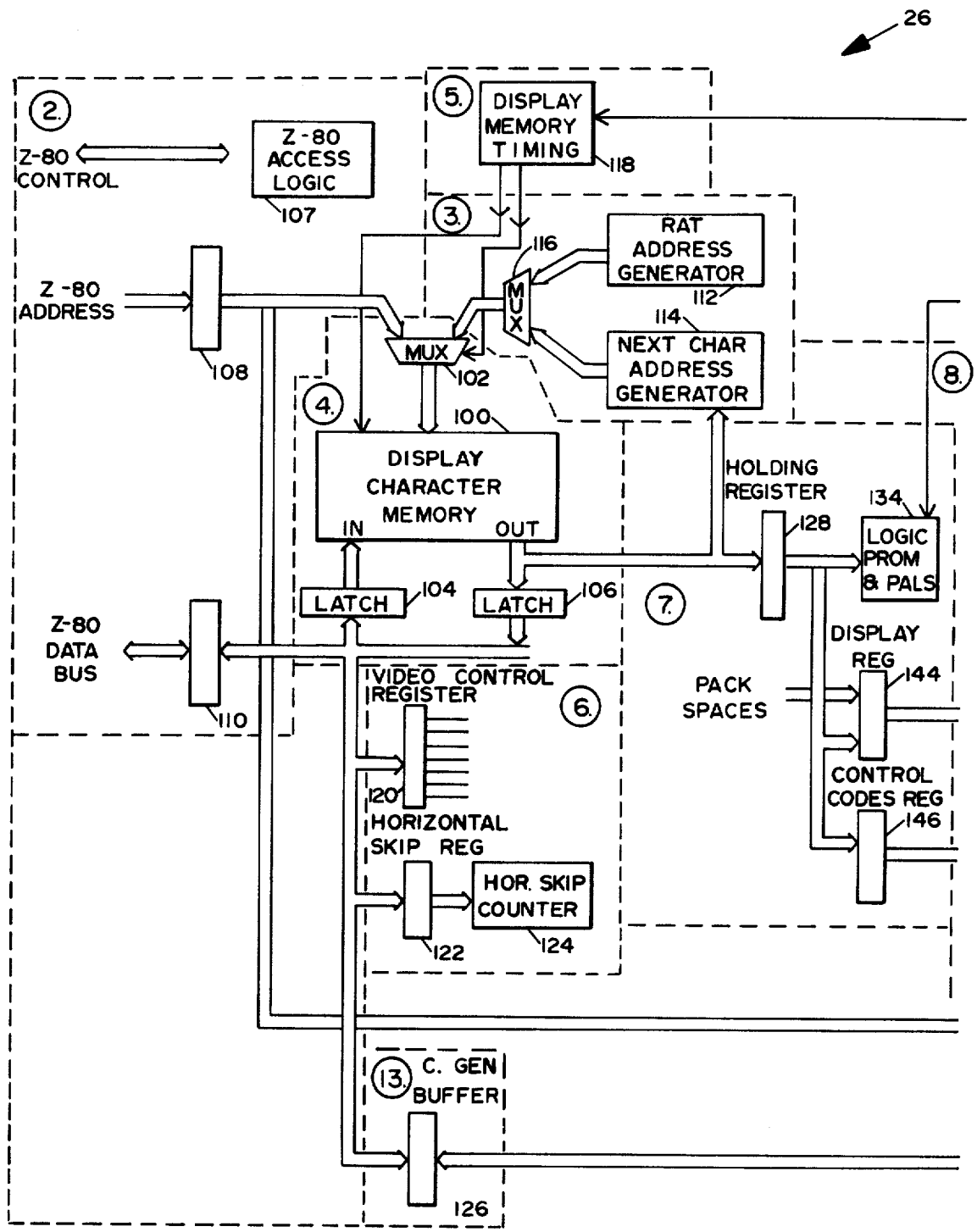
FIGS. 5A and 5B illustrates a block diagram of an electrical circuit of a display controller for the word processor.
Figure 5B:
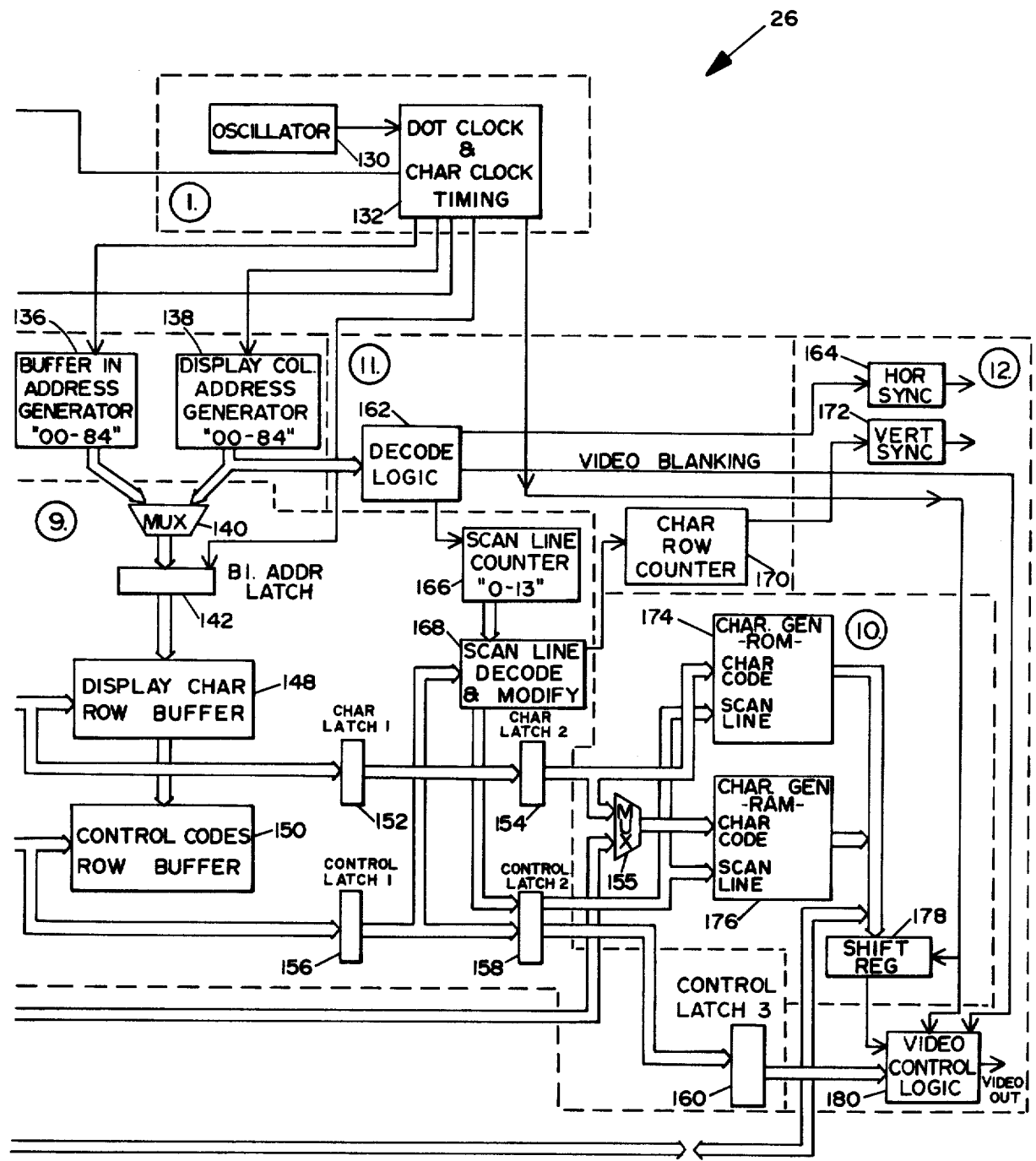

FIG. 1 illustrates a word processor 10 including a keyboard 12, a cathode ray tube (CRT) 14, and two disk drives 16 and 18, all positioned in a geometrically configured housing 20. The housing encloses a processor logic board 24, as illustrated in FIG. 4, a display controller logic board 26, as illustrated in FIGS. 5A and 5B, a power supply 28, and CRT deflection and video amplifier circuitry 30, as illustrated in FIG. 2. The keyboard 12 connects to the word processor 10 with a cable having modular telephone plugs. A printer 22 connects to the word processor 10 with cable. The word processor 10 is configured to fit on a typing "L" of a secretarial station or on any other desk.

FIG. 2 illustrated a block diagram of an electrical circuit of the word processor 10 where all numerals correspond to those elements previously described. The processor board 24 can include 64K of storage and the display controller board can include 16K expandable to 64K of storage by way of example and for purposes of illustration only and is not to be construed as limiting of the present invention.

Figure 3:
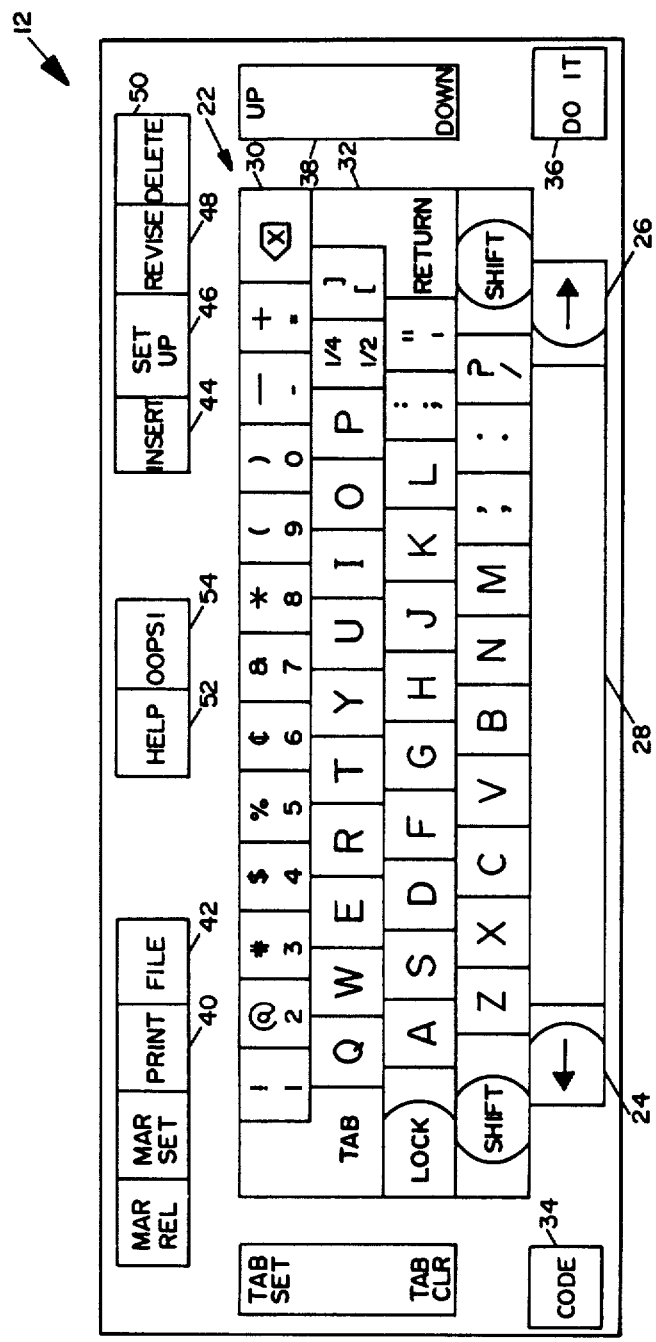
FIG. 3 illustrates a plan view of a keyboard of the word processor.

FIG. 3 illustrates a plan view of the keyboard 12. The keyboard 12 includes the standard typewriter keyboard 32. The keyboard is identical or very similar to the standard office typewriter keyboard including keys A-Z, numerals, and punctuation in upper and lower case. In addition to the standard keys, there is a backspacer key 34, a forward spacer key 36, a spacer bar 38, a correction key 40, a return key 42, a code key 44, a DO IT key 46, a scroll key 48, function keys including a print key 50, a file key 52, an insert key 54, a set up key 56, a revise key 58, and a delete key 60, and a help key 62, when pressed by one of the six function keys 50-60 displays an electronic manual on the CRT 14. An OOPS KEY 64, when pressed eliminates the action taken by the last keystroke. The keyboard 12 is supported in an angular configured case 66 as illustrated in FIG. 1.

FIG. 4 illustrates a block diagram of the electrical circuit for the processor logic board 24. The processor logic board 24 includes a central processor unit (CPU) 68, a clock 70, a read only memory (ROM) 72, a random access memory (RAM) 74, a direct memory access (DMA) 76, a floppy disk controller (FDC) 78, and a buffer 80, all of which connect to the data bus. The processor logic board 24 also includes a counter timer circuits 82 and 84, a clock 86, a dual asynchronous receiver transmitter 88, a serial input/output 90, a logic control register 92, and an LED display 94, for checking commands on a power up condition prior to operation. A floppy disk interface 96 connects between the FDC 78 and each of the disk drives.

FIGS. 5A and 5B, which figures are divided and matched, illustrate the display controller board 26 including a display character memory 100 of the address bus, data bus and control lines of the CPU 68, connect into the memory 100 through multiplexer 102 and latches 104 and 106 and through buffers 108 and 110. A row address table (RAT) address generator 112 and next character generator 114 connect to memory 100 through a MUX 116 and the MUX 102. A display memory timing logic 118 connects to memory 100 and MUX 102. A video control register 120, a horizontal skip register 122 and horizontal skip counter 124 and a control generator buffer 126 also connect to the data bus lines. Holding register 128 connects between character address generator 114 and memory 100. Clock 130 connects to dot clock and character clock 132 which controls circuit timing for the display control logic board 26 and the video circuits. The timer 132 connects to one logic of programmable read only memory (PROM) and programmable array logic (PAL) 134; two, a buffer in address generator 136; three, a display column address generator 138; four, an address latch 142; five and six, a video control logic and a shift register 180; and seven, the display 178 memory timer 118. Display code register 144 and control code register 146 connect between the holding register 128 and a display character row buffer 148 and a control code row buffer 150 respectively.

Character latch 1 (152) and character latch 2, (154) connect in series to the input/output of display character row buffer 148, which is connected to the output of display code register 144. Control latch 1 (156) and control latch 2 (158) connect in series to the input/output of control code row buffer 150 which is connected to the output of control code register 146. A control code latch 3 (160) connects to video control logic 180. Decode logic 162 connects between horizontal sync. generator 164, and the display column address generator 138. A scan line counter 166 and a scan line decoder 168 connect between decode logic 162 and latch 158. A character row counter 170 and vertical sync. generator 172 in series connect to the scan line decoder 168. A character generator ROM 174 and a programmable character generator 176 connect to latches 154 and 158 respectively. The programmable character generator, random access memory, provides for special unique characters on the CRT screen such as reduced sized numbers for the margin, tick marks for the margins, and foreign language characters. Shift register 178 connects to generators 174 and 176. Video control logic 180 connects to the latch 160, the shift register 178, and outputs a video signal to the CRT deflection and video amplifier 30 of FIG. 2 for display on CRT 14. Elements 128, 134, 144, and 146 of block 7 of FIG. 5A are also referred to as data sort logic where the data is the information which is being processed. Multiplexer 155 connects between the address logic 108 and character latch 2 (154) and to the character generator RAM 176.

FIGS. 5A and 5B are further described in detail with reference being made to the twelve blocks divided by and segmented by dashed-segmented lines in the figure and each block designated by block number in a circle. Block 1 in FIG. 5B is a clock and timing circuit 130 and 132 which provides all logic timing signals. Block 2 in FIG. 5A provides interfaces 107 and 108 for logic signals between the processor circuit of FIG. 4 and the display controller circuit of FIG. 5. Block 3 includes the counter 112 and 114 which generate addresses for the memory 100. Block 4 includes the display memory 100 which stores the RAT tables as previously described as well as all control codes and display codes. Each of the two RAT tables has 57 entries of two bytes each, 114 bytes long where each RAT is located in the top page of the 256 byte area of the RAM. The display memory 100 stores and provides access through the RAT tables to characters and the attributes so that visible control codes or extra positions on the screen are not required. The memory can be referred to as a multidimensional memory such as five dimensions or a layered memory.

Block 5 supports the display memory timing 118 which provides signals for accessing the display memory and provides arbitration logic resolving signal conflicts between the processor logic and the display logic. Block 6 includes registers 120 and 122 which the processor circuit controls and writes to. The video control register 122 sets the characteristics of the display and which part of the memory the processor writes to. The horizontal skip register 122 with horizontal skip resistor 124 controls horizontal scrolling. Block 7 acts as a filter for control of sorting of display characters for categorizing into three positions of: (1) display buffer 148 for each character to be displayed; (2) control buffer 150 for dimensions of each character; and (3) disposing away of signals such as software codes, etc. Block 8 includes counter 136 providing addresses for writing in and counter 138 for providing addresses for reading from the row buffers 148 and 150.

Block 9 includes display character row buffer 148 and control code row buffer 150 for display and control codes buffered in on a row by row basis. Block 9 also includes the scan line logic that generates the scan line count for the character generators 174 and 176. The scan line logic can modify the scan line count for generating superscripted and subscripted characters. The scan line logic can also determine the appropriate scan line position for displaying the strikethrough and underline attributes. The scan line count inputs into each of the character generators 174 and 176. Scan line logic is also in this block for determining line codes, etc. Block 10 includes character generators 174 and 176 for generating each character in a 9×14 field. The generators convert character codes and scan line codes into binary equivalents of pixels to be displayed. The block also includes video shift register 178. Block 11 includes logic 162 for decoding count for horizontal retrace time, vertical retrace time, and blanking time. Block 12 interfaces to the CRT and includes the video control logic 180. Block 13 includes the character generator buffer 126.

Figure 6:
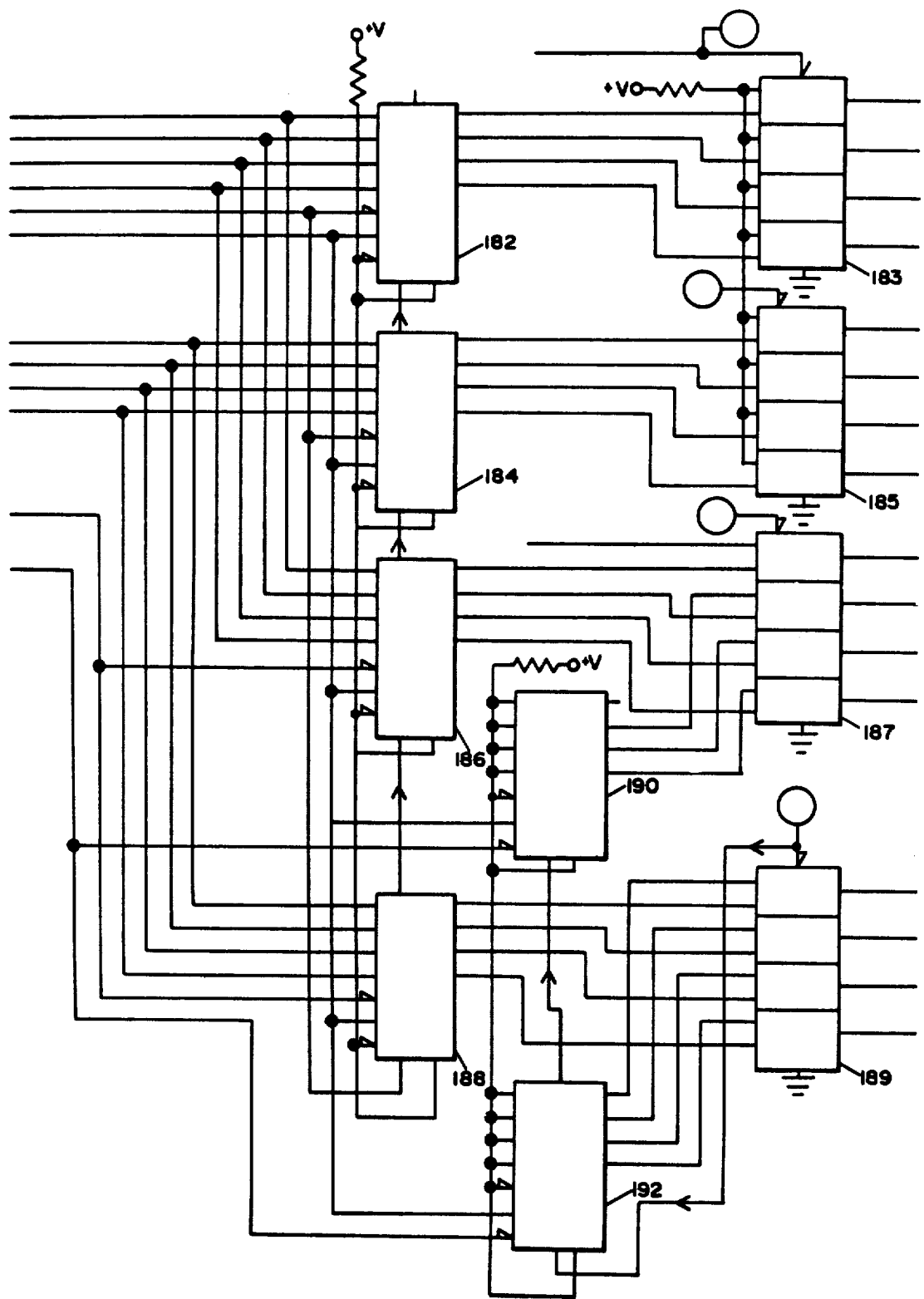
FIG. 6 illustrates an electrical circuit for a Row Address Table (RAT) generator and Next Character Address Generator of FIG. 5A.

FIG. 6 illustrates an electrical circuit for the RAT address generator and next character address generator, block 3 of FIG. 5A. The next character address generator 114 are 16 bit counters 182–188 which generate the memory address that is used to determine from what location in memory each character of any row is to be obtained from. At the beginning of each row, the counters 182–188 are loaded with a 16 bit starting address which is obtained from the row address table. From the starting address, the next character generators generate 250 sequential addresses. The row access table address generator 112 is a 7 bit counter 190 and 192 that provide the memory address used to access each RAT location as each entry in the RAT is 16 bits (2 bytes), the generator provides two addresses during each access of the RAT at the beginning of each row. The circuit inherently provides for the linking of the RAT'S. Multiplexers 183, 185, 187, and 189 are for selecting either the next character address or the RAT address as required.

Figure 7A:
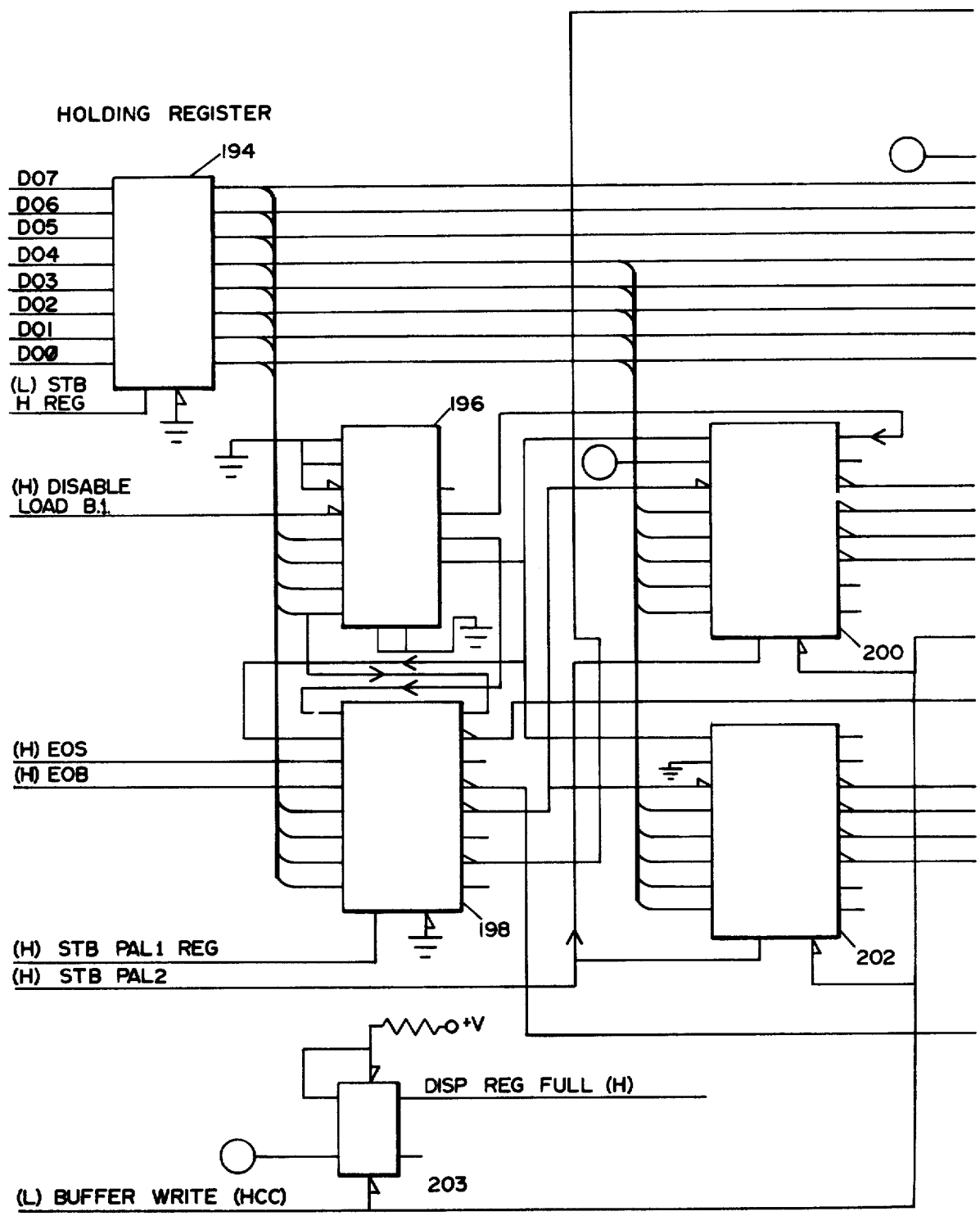
FIGS. 7A and 7B illustrates an electrical circuit for Data Sort Logic of FIG. 5A.
Figure 7B:
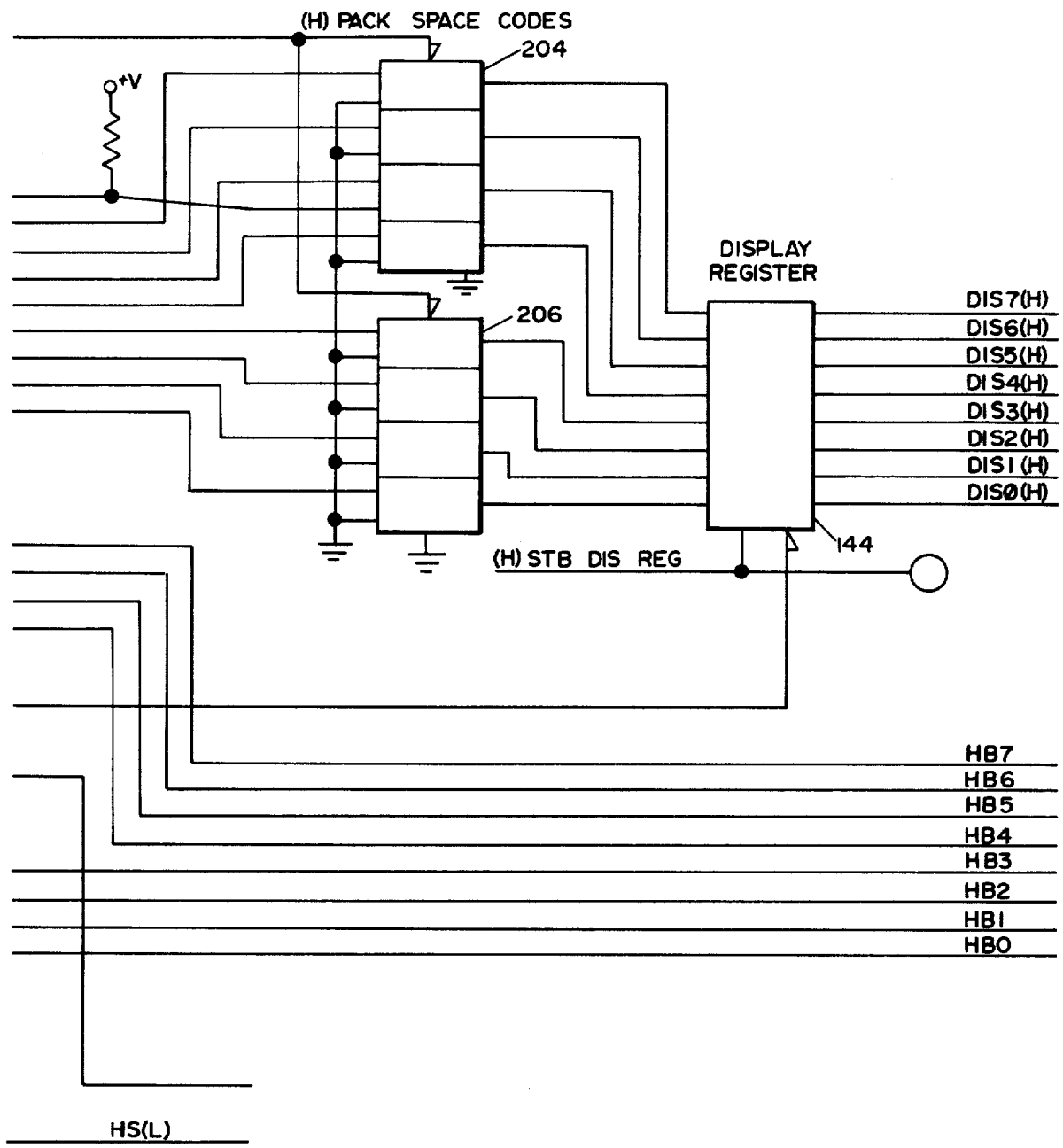

FIGS. 7A and 7B illustrates an electrical circuit for the data sort logic, block 7 of FIG. 5A. Characters are obtained from the display memory 100 one at a time and inputted to the holding register 194. PROM 196 decodes the character into one of 3 types as delineated below:
1. Top character code, 'BO-BF' hexidecimal;
2. Non-displayabel code, 'CO-FF' hexidecimal; and
3. Hardware control code, 'EO-FF' hexidecimal.

The PAL 198 determines how the displayed line should be completed or started, the PAL also detects a video carriage return code ('ED') and the rest of the row to be filled with spaces. The PAL also detects the start blank code 'E7' and results in spaces to be placed on the CRT screen for this row until the stop blank code 'F7' is detected. The PAL also detects the horizontal skip enable code 'EB' and results in displayed codes to be disposed of until the horizontal skip count has been completed by the EOS signal going active.

The PAL 200 and 202 determines the status of the hardware control function and inputs the appropriate bit into the control code row buffer memory 150. The PAL's 200 and 202 are active when the HCC line is active and stops functioning when a carriage return is detected. When PAL 198 is activated to insert a space after a carriage return or during a blank, the PAL 198 signals the multiplexers 204 and 206 to write the code for space ('20') into the display register 144. PAL 202 also includes the logic for the control code register 146. The PALS 198–202 also generate top character codes as discussed in the mode of operation. FIG. 7A includes the PROM 196 and PALS 198–202. Flip-flop 203 starts the next cycle. Each cycle includes retrieving the character from the display memory 100; placing the character into the holding register 128; the PROM and PAL 134 determines the disposition of the character into display, control, or discard; buffering the character into buffers 144 and 146; writing the character in buffers 148 and 150; and the flip-flop 203 is reset prior to character generator retrieval.

FIG. 7B includes the display register 144 and the multiplexers 204 and 206 which pack space codes by loading in blank character codes, a 'hexidecimal 20', in lieu of regular codes.

MODE OF OPERATION

The word processor 10 is set up on a support structure such as a secretarial "L" and is plugged into a source of power. An off-on switch is then activated supply power to the word processor 10 and to the printer 22 through the processor 10. The system software is then loaded into the processor memory 74 by inserting a floppy disk into one of the two disk drives, in this instance disk drive 18. The DO IT 46 key is then pressed. The software floppy disk is then removed and a regular disk is then inserted into the disk drive 16.

Briefly and as later discussed in detail, a document is now generated once typing functions are set such as positioning the electronic paper on the CRT by scrolling through the up/down scroll key, positioning the gray bar cursor on the screen, and reviewing the margin line and information line below the screen. The printer is powered up through a toggle switch in the back, the paper scale is adjusted and paper is inserted. A document can be printed directly from the CRT screen by pressing the PRINT key followed by pressing 'S' according to the menu below:

D Print document from diskette.
K Type keyboard directly on printer.
S Screen contents to printer.
F Specify printer features.

The menu below brings a document to the screen memory from the diskette and stores documents from screen memory on the diskette, the menu set forth below:

G Get document from diskette.
S Store document on diskette.
T Display diskette table of contents.
U Utility menu.

Now, the 'S' key is pressed for Store, the upper or lower disk is selected, the document is given a name, followed by pressing the DO IT key. As storage occurs, another electronic sheet of paper is generated on the screen. Storage automatically takes place in the drive 16 having the floppy diskette; otherwise, a selection would be made between the two drives.

A next document must be labelled with a number as requested by the display and on so typing the name of the document, and the DO IT key is again pressed. Then, the PRINT key is pressed, followed by the 'D' key from the print menu, the appropriate diskette is selected by diskette label, followed by the DO IT key. Then the name of the document is typed in, followed by the DO IT key and the printer 22 subsequently prints the letter.

The electrical operation of the Display Controller 26 is now described in detail. The Display Controller 26 controls the generation of video on the CRT 14. While the processor contains 64K of RAM, the Display Controller contains 16K of memory, expandable to 64K of memory. The CRT operates in a portrait mode. Images are painted on the screen by breaking the characters into discrete scan lines. The refresh rate is every 1/60th of a second for this particular CRT. There are a total of 833 scan lines with 798 visible scan lines in this example. The horizontal rate is 50 kHz with the retrace time of 5 microseconds, while the time to get across the page is 15 microseconds. Each character is comprised of 8 dot columns and 12 scan lines. Each character is on a 10×14 dot field matrix. There are 85 characters across the screen from left to right, 765 dots total. All characters are built with dots.

The Display Memory 100 has 16K or 64K of memory. The Display Memory has a plurality of Row Address Table (RAT) which stores strings of information for each string describes data for each row of the CRT. The strings are dynamic in that the strings float between the Row Address Tables. The memory stores strings of information. The strings can be stored anywhere in the memory. Each string describes the data which is to be displayed on each row of the CRT. Strings may also overlap dependent upon the length of each string between the RATS. A string can be up to 260 characters long but only creates a display of up to 85 characters. Each RAT can be described and analogized to a table with specific addresses for each row where each address is two bytes. The RATS provide for moving of addresses in the boxes thereby increasing speed of the system. Since for each row to be displayed, the RATS are accessed again, any static change or power line glitch will only be temporarily visible on only the one display row. The RATS in effect provide a table lookup for addressing of each row. The RAT address generator 16 determines the storage and the display character memory. Vertical scrolling utilizes a ladder effect in process between the two tables in the RAT 112.

Prior to display, characters are retrieved from the memory 100 with assistance of the RAT address generated from 112, and held in holding register 128. Each character or groups of characters are held for display in the row buffer 148, and the control codes are held in row buffer 150. Prior to being passed to the buffers 148 and 150, the information is passed through the logic PROM and PAL 134 where it is sorted. The use of the logic PROM and PALS considerably reduces the logic requirement.

When a character is displayed, the display of the character includes what character is displayed, how the character is displayed, whether a character is not displayed, and the control of that character. This type of storage of information might be analogized to a multidimensional memory. As one character is being displayed, the buffer is being filled for display of the next character. This type of display and subsequent filling for the next character is handled by buffers 148 and 150. The row buffering corresponds to the 85 characters across and the 57 characters down, this corresponding to the size of the screen. The how displayed includes the attributes of reverse video, underline any character, dim any character, bold, strike through, superscript, subscript, top characters, or a blank. The control codes also provide for the video carriage return where the remaining boxes are filled with space codes.

Horizontal scrolling is controlled by the Horizontal Skip Register 24 and the Horizontal Skip Counter 26. The horizontal scrolling provides that one can scroll 255 characters across even though the screen displays 85 characters across. The Horizontal Skip Counter 124 stores the number of characters to be skipped but in a power up condition, zero is stored.

The Character Generators 174 and 176 are required to display the retrieval of each character 14 times. While doing this operation, the Character Generator is looking to the Row Buffers 148 and 150 for the next character.

The Video Control Register 120 is an 8-bit register provides for operation of the screen of the CRT. One of the bits tells the hardware that the software is going to load the character generator, in addition to other operational screen functions. The Control Generator Buffer 126 provides for control of the Shift Register 178.

To place a character onto the screen, a display character has to be retrieved 14 times for each character. The character is retrieved and positioned in the Latches 152 and 156. Subsequently, the characters are transferred from the Character Generators 174 and 176 to the Shift Register 178. The Shift Register 178 shifts out the 7 dots per character while characters are being displayed, additional characters are being retrieved to fill in the shift register 178 and other logic through the chain of logic in memory 100.

While the characters for one row are being accessed the 14 times to create the display for that row across the dot matrix field, the data for the next row is accessed from the display memory 100, sorted by the logic in block 10 and written into the row buffer of block 9.

Sequence instructions are burned into the IC's for processor board hand shaking sequences; scan line timing and scan line decoding sequences; character column decoding including horizontal timing sequences; vertical timing sequences for the data sort PROM 196 of FIG. 7A; sequences for the PAL's 198-202 of FIG. 7A; and sequences for the character generators 174 and 178. The sequences utilize hexidecimal codes through the PAL's, ROM's and character generator ROM's.

FIG. 7A includes PAL's 198-202 which inherently have the electrical capability of adding a top character to another character such as e, n, a, etc. In this configuration, a second code is utilized in addition to the code for the main character such as "e" could be a '65' code, an "ê" could be a "B1 65' code. When the row buffer is being filled, PAL 200 sets the top character bit in the control code row buffer 150 if a character is to be one with a top character. During display of the row, if a character is retrieved from the row buffer with the top character bit set and if the logic is generating a display for one of the first four scan lines, the top character display code "B1" in this example) is presented to the character generator. If the display is for a scan line other than the first four, the code for the main character is presented ("65" in this example) to the character generator.

The system's logic generates the sequences into display memory buffers where the system logic also takes control of the processor. The system's logic is responsible for decode instructions, processing control, and providing that the hardware generates the document on the CRT screen.

The user can also select appropriate typing features through the function keys such as the FILE, PRINT, SET UP, or REVISE keys. These menus provide a question with a question requiring an answer such as, what is the name of the document or a multiple choice question such as selecting the typing pitch. The menu shows an active mode status on the comment-information line, a single or multiple choice question on the interface-information line (also referred to as the communication line) and an explanation of activating the feature in the menu area.

When a single answer is required, the answer is typed into white background area of white video on the screen followed by pressing the DO IT key to perform that desired selection. The menu area provides the necessary explanation to the user as to the input information required to activate the system once the information is typed on the screen and once the DO IT key is pressed.

When a multiple choice question is provided, a "white block" white background video is moved over the selected feature through the arrow keys ←, → (the white background area is moved to the left or right with the horizontal motion keys) and the DO IT key is pressed.

The dialogue line provides the multiple choice questions with the horizontally white moving window back and forth over the appropriate selection. The dialogue line provides the appropriate operator-system interaction during the creation of a document on the electronic sheet of paper of the word processor. The dialogue line, also referred to as the interface line displays the active features of the word processor system during document creation.

The following menus delineated below provide single or multiple choice questions for user selected features.
"FILE" mode
INTERFACE: WHAT IS THE NAME OF THE DOCUMENT?
MENU: Enter up to 30 characters; then Press the DO IT key.
"PRINT" mode
INTERFACE: WHAT IS THE NAME OF THE DOCUMENT?
MENU: Enter up to 30 characters; then Press the DO IT key.
"SET PRINTER" mode
INTERFACE: TYPE OF PAPER FEED: Single sheet, continuous form, or Automatic sheet feeder.
MENU: You may select the desired option by moving the white background to the left or right with the horizontal motion keys (←, →). When correctly positioned, press the DO IT key. For more information, press HELP.
"FORMAT PAGE" mode
INTERFACE: SELECT PITCH (CHARACTERS PER INCH): (10), (12), (15), or (PS).
MENU: You may select the desired option by moving the white background to the left or right with the horizontal motion keys (←, →). When correctly positioned, press the DO IT key. For more information, press HELP.
"FORMAT PAGE" mode
INTERFACE: SELECT RIGHT MARGIN FORM: Blocked, Justified, or Ragged.
MENU: You may select the desired option by moving the white background to the left or right with the horizontal motion keys (←, →). When correctly positioned, press the DO IT key. For more information, press HELP.
"FORMAT PAGE" mode
INTERFACE: SELECT HYPHENATION METHOD: Automatic or Manual
MENU: You may select the desired option by moving the white background to the left or right with the horizontal motion keys (←, →). When correctly positioned, press the DO IT key. For more information, press HELP.
"FORMAT PAGE" mode
INTERFACE: SELECT PAGE HEIGHT: 11 inches (normal), 14 inches (legal), or other.

MENU: You may select the desired option by moving the white background to the left or right with the horizontal motion keys (←, →). When correctly positioned, press the DO IT key. For more information, press HELP.

"FORMAT PAGE" mode

INTERFACE: SELECT LINE SPACING: Single, 1.5, Double, or Triple.

MENU: You may select the desired option by moving the white background to the left or right with the horizontal motion keys (←, →). When correctly positioned, press the DO IT key. For more information, press HELP.

"FORMAT PAGE" mode

INTERFACE: SELECT PAGE NUMBER LOCATION: Top, Bottom, or Suppress Completely.

MENU: You may select the desired option by moving the white background to the left or right with the horizontal motion keys (←, →). When correctly positioned, press the DO IT key. For more information, press HELP.

"FORMAT PAGE" mode

INTERFACE: PAGE NUMBER LOCATION: Left, Right Center, or Alternating Left/Right.

MENU: You may select the desired option by moving the white background to the left or right with the horizontal motion keys (←, →). When correctly positioned, press the DO IT key. For more information, press HELP.

"FORMAT PAGE" mode

INTERFACE: STARTING PAGE NUMBER: 1

MENU: Insert the desired number; then Press the DO IT key.

"FORMAT PAGE" mode

INTERFACE: START NUMBERING AT WHICH PAGE: Page 1, or Page ?.

MENU: You may select the desired option by moving the white background to the left or right with the horizontal motion keys (←, →). When correctly positioned, press the DO IT key. For more information, press HELP.

"FORMAT PAGE" mode

INTERFACE: SELECT TOP MARGIN: 0.5 Inches, 1 Inch, 1.5 Inches, or Other.

MENU: You may select the desired option by moving the white background to the left or right with the horizontal motion keys (←, →). When correctly positioned, press the DO IT key. For more information, press HELP.

"FORMAT PAGE" mode

INTERFACE: SELECT BOTTOM MARGIN: 0.5 Inches, 1 Inch, 1.5 Inches, or Other.

MENU: You may select the desired option by moving the white background to the left or right with the horizontal motion keys (←, →). When correctly positioned, press the DO IT key. For more information press HELP.

"SPACING" mode

INTERFACE: SELECT LINE SPACING: Single, 1.5, Double, or Triple.

MENU: You may select the desired option by moving the white background to the left or right with the horizontal motion keys (←, →). When correctly positioned, press the DO IT key. For more information, press HELP.

"SEARCH" mode

INTERFACE: WHAT IS THE STRING?

MENU: Enter up to 30 characters; then press the DO IT key.

"SEARCH" mode

INTERFACE: SEARCH DIRECTION: Toward beginning, or toward end of document.

MENU: You may select the desired option by moving the white background to the left or right with the horizontal motion keys (←, →). When correctly positioned, press the DO IT key. For more information, press HELP.

"SEARCH" mode

INTERFACE: NUMBER OF SUBSTITUTIONS: Once only, all occurances, selectively, or other.

MENU: You may select the desired option by moving the white background to the left or right with the horizontal motion keys (←, →). When correctly positioned, press the DO IT key. For more information, press HELP.

In selecting and pressing one of the user preference function keys of PRINT, FILE, SET UP, REVISE OR DELETE, the following menus on the CRT screen appear as delineated below and as starred with an asterisk. Each menu displays in in capital letters, the title of the menu, such as "PRINT" on the comment or information line (referred to as mode), and one-five lines of menus with a capital letter proceeded by an explanation for each selection. The comment line indicated to the user the current active selected status of the word processor. The other menus not starred appear on the screen by pressing the designated key in the previous menu. For example, after pressing the "PRINT" function key, the key "S" would print the screen contents to the printer while the key "F" would bring the "printer" menu to the screen for further feature selection.

The menu selection triggers the appropriate interaction between the word processing system and the operator. The menu in effect quizzes the operator for information needed to accomplish an end desired task. The operator in effect communicates with the system where the system prompts the operator through with dialogue line, also referred to as the communications line.

The menus are now set forth below for user selected function keys.

*"PRINT" mode

D Print document from diskette;
K Keyboard directly to printer;
S Screen contents to printer;
F Specify printer features.

"PRINTER" mode-only occurs if printer is in single document sheet mode and the document is longer than one sheet P Print (I have inserted a new sheet)
R Reprint last page
S Stop Printing

*"FILE" mode

G Get document from diskette;
S Store document on diskette;
T Display diskette Table of Contents;
U Utility menu.

"FILE UTILITY" mode

R Rename a document;
C Copy a document;
D Delete a document;
H History of document;
E Erase a disk;
B Backup a disk;
I Initialize a disk;
S System Installation

*"SET UP" mode could have lock, bold or other information
C Center;
L Left margin indent;
R Right margin indent;
U Underline continuously;
W Word underline;
B Bold type;
P New Page;
A Additional commands.
  "SET UP-2" mode
ST STrike through;
SP SuPerscript;
SB SuBscript;
L Change Line spacing.
  *"REVISE" mode
G Go to menu;
F Find phrase;
S Search menu;
C Cut and paste menu;
M Merge menu;
R Reform paragraph;
P Page layout;
A Additional commands.
  "GO TO" mode
B Beginning of document;
P Previous page;
N Next page;
S Specific page;
E End of document.
  "CUT AND PASTE" mode
M Move text;
C Copy text;
E Exchange text;
S Save text in memory;
R Recall text from memory;
D Delete text.
  "MERGE" mode
B Build insert file;
E Edit insert file;
P Print merged documents;
S Produce Single merged document.
  "REVISE-2" mode
L Last line to next page;
F First line to last page;
M Mark document for comment;
K Keystroke memory;
C Connect lines;
E Mark Edited lines.
  *"DELETE TEXT" mode
C Character delete;
W Delete Word;
L Delete Line;
S Delete Sentence;
P Delete Paragraph;
B Delete Block;
T Delete Top of document;
E Delete to End of document;

The electronic sheet of white paper is vertically scrolled on the screen with the UP or DOWN key. The scrolling of the electronic sheet of paper also includes the scrolling of the page break with additional sheets following.

The margin line is vertically scrolled up or down the sheet with the UP or DOWN key and the CODE key simultaneously. The cursor moves on the typing line which is one line above the margin line, and is scrolled with the margin line. The cursor disappears on display of a menu as a user is selecting a typing feature or attribute or scrolling into the top or bottom of a sheet of paper.

The area below the electronic white sheet of paper displays four lines as accordingly positioned. First line is the typing line, the line which displays the movable cursor. Second line is the electronically generated and displayed margin scale (index line) including small number for the selected typing pitch and scale tabs in between each number. Third line is the comment-information line which displays active features such as attributes, the page number and the line number. Fourth line is the interface-dialogue line which provides the choice of selections over which the white window positions for the desired determined selected active feature. The area below the fourth line is for display of the menu information.

The HELP key provides a plurality aids leading an individual through the word processor and a plurality of aids explaining what the functions are. The HELP key provides that one can become familiar with the function keys on the keyboard. Pressing the OOPS key after pressing the HELP key will clear the previously depressed key. The number of tutorial aids is in this praticular embodiment is about seventysix and are similar in language to the previously described menus in that the remaining HELP menus are not set forth in detail for the sake of brevity of the patent.

The logic also provides for video carriage return (VCR) where the sentence is wrapped around to the next row and any remaining spaces in the row is packed with spaces. The inherent wrap around eliminates the requirement of depressing the return key as the carriage return is inherently generated and the sentenced is wrapped around to the next row thereby providing for a continuous typing sequence by the typist.

Figure 8:
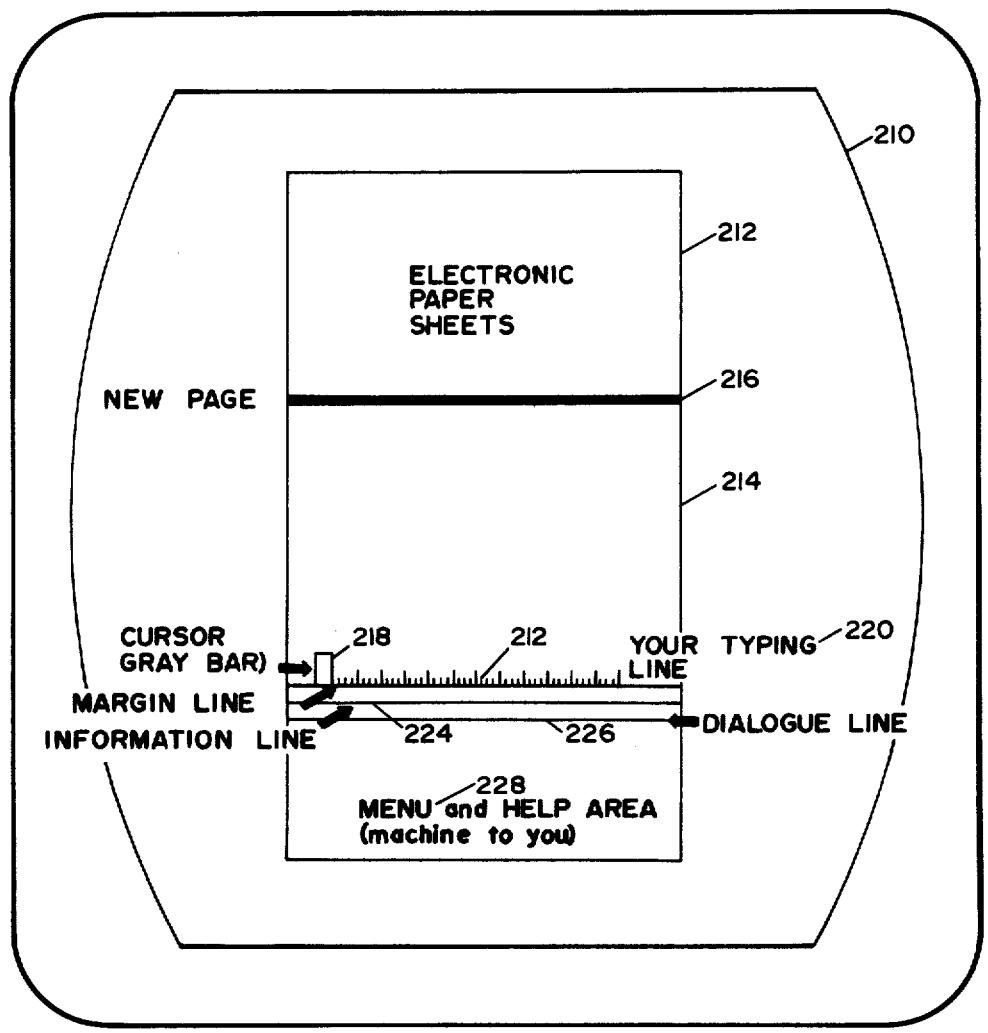
FIG. 8 illustrates a generated CRT display.

FIG. 8 illustrates a plan view of the configured CRT screen 210 including screen display of the logic generated typing features as now described. Two electronic sheets of paper 212 and 214 are generated on the screen 210 with a page break 216 generated in between the two sheets in this specific example for purposes of illustration only and not to be construed as limiting of the present invention. A gray bar cursor 218 moves along the typing line 220 directly above a margin line 222 including small ticks, large ticks in between and a small pitch number at each large tick. The information-comment line 224; the dialogue communications line 226; and, the memo and help instruction and tutorial aid are a 228. In this particular example, the conceptual integrity of a typewriter is illustrated by the two electronic sheets of white paper. The gray bar cursor at the typing line, and the distinct typing line as a typist would view such during typing. The lower display of the memo instruction and help tutorial aid indicates either what features are selected or assist in helping the typist to select features. The keynote point is that all information as would be viewed is fully displayed on the length of the CRT screen 210 providing an entire concept with integrity of the ongoing work.

The cursor on the typing line and the margin line is movable about the entire length of each electronic sheet of paper and in between the page breaks. While in a normal mode of typing, the curson and typing line and margin line would be positioned at the bottom of the page, the typing line and margin line are movable as a unit to any position on the page.

The menu or tutorial area is displayed below the margin line when the margin line is in a home position and is in the lower nine lines of the CRT display. The information line displays the selected typing features including the spacing, the pitch, the page number, and the line number.

During the typing process, the electronic sheet of paper is made to automatically advance up the height of CRT screen from bottom to top including the pages breaks inbetween each electronic sheet of paper.

The electronic sheet of paper generated on the CRT screen will display the attributes including the bold, strike through, and any other selected attributes.

Various modifications can be made to the word processor of the present invention without departing from the apparent scope thereof.

Having thus described the invention, what is claimed is:

1. Word processor including an input keyboard, at least one disk drive, and a cathode ray tube screen for display, all positioned in a single geometrically configured housing for a desktop, and a printer connected to said word processor, said word processor comprising:
    a. means for processing information, said processor means including means for interfacing a keyboard and disk drive for inputting information, a printer for outputting information, and a cathode ray tube for displaying information, said processor means including storage means;
    b. means for controlling said CRT display, said controlling means including display memory means for said CRT display, said display memory means including row address table means for dynamically storing strings of data in row address tables, and means providing for said strings of data overlapping between said tables;
    c. means for generating at least one electronic white sheet of paper on said CRT display including four margins of said paper, and;
    d. means for generating on said CRT display a plurality of system-user interaction lines, said line generating means including means for generating
        a. margin line,
        b. a comment-information line, and;
        c. a dialogue-interface line whereby said dialogue lines are prompting to an individual user.

2. Word processor of claim 1 comprising means for generating successive electronic sheets of paper and means for generating a page break between successive electronic sheets of paper.

3. Word processor of claim 1 comprising means for generating on said CRT display a plurality of system-user interaction lines.

4. Word processor of claim 1 comprising means for generating a plurality of menus, each of said menus providing at least one user oriented question whereby said menu quizzes a word processor operator for information.

5. Word processor of claim 1 comprising
    a. means for generating a plurality of selections on said dialogue-interface line, and;
    b. means for selecting one of said plurality of selections.

6. Word processor of claim 5 wherein said selecting means comprises:
    a. video block window means movable over one of said plurality of selections, and;
    b. means for moving said video block window means.

7. Word processor of claim 1 comprising:
    a. a plurality of function keys on said keyboard;
    b. means for generating a plurality of function menus for user selected keys corresponding to each of said function keys;
    c. means for displaying each of said function menus.

8. Word processor of claim 7 wherein said function keys comprise a PRINT key, a FILE key, an INSERT key, a SET-UP key, a REVISE key, and a DELETE key.

9. Word processor of claim 1 comprising:
    a. a HELP function key on said keyboard;
    b. means for generating a HELP menu including a plurality of means for selecting user selected tutorial selections, and;
    c. means for displaying said HELP menu.

10. Word processor of claim 1 comprising
    a. an OOPS function key on said keyboard, and;
    b. means for recovering a previous keyboard entry.

11. Word processor of claim 1 comprising means for generating a plurality of page breaks between a plurality of sheets of electronic paper.

12. Word processor including an input keyboard, at least one disk drive, and a cathode ray tube (CRT) screen for display of information positioned in a geometrically configured housing and a printer connected to said word processor, said word processor comprising:
    a. means for processing information, said processor means including means for interfacing to a keyboard and disk drive for inputting information, a printer for outputting information, and a CRT for displaying information, said processor means including storage means;
    b. means for controlling said CRT display, said means including display memory means for said CRT display, said display memory means including means for row address tables for dynamically storing strips of data in row address tables, and means providing for said strips of data overlapping between said tables;
    c. means for generating a plurality of menus on said CRT display including each of said menus providing at least one user oriented question, said menu quizzes an operator for information;
    d. means for selecting a menu from said menu means, and;
    e. said menu means including a HELP menu of tutorial aids whereby said HELP menu provides assistance by way of tutorial aids to said operator.

13. Word processor of claim 12 wherein said menu means comprises a PRINT menu.

14. Word processor of claim 12 wherein said menu means comprises a FILE menu.

15. Word processor of claim 12 wherein said menu means comprises a FILE UTILITY menu.

16. Word processor of claim 12 wherein said menu means comprises a SET UP menu.

17. Word processor of claim 12 wherein said menu means comprises a REVISE menu.

18. Word processor of claim 12 wherein said menu means comprises a GO TO menu.

19. Word processor of claim 12 wherein said menu means comprises a CUT AND PASTE menu.

20. Word processor of claim 12 wherein said menu means comprises a MERGE menu.

21. Word processor of claim 12 wherein said menu means comprises a REVISE menu.

22. Word processor of claim 12 wherein said menu means comprises a DELETE TEXT menu.

23. Word processor of claim 12 comprising means for positioning a cursor at any predetermined location on said display means of said word processor.

24. Word processor of claim 12 comprising means for generating a white background electronic sheet of paper.

25. Word processor of claim 24 comprising means for generating an electronic break between two sheets of said white background electronic paper.

* * * * *